United States Patent
Gribble et al.

(10) Patent No.: US 7,605,757 B1
(45) Date of Patent: Oct. 20, 2009

(54) MULTIPLE SIGNAL RECEIVER

(75) Inventors: David A. Gribble, Cedar Rapids, IA (US); Theodore J. Hoffmann, Hiawatha, IA (US); Jerzy K. Richter, Cedar Rapids, IA (US); Roger A Dana, Marion, IA (US); Shannon D. Hauerwas, Cedar Rapids, IA (US)

(73) Assignee: Rockwell Collins, Inc., Cerdar Rapids, IA (US)

( * ) Notice: Subject to any disclaimer, the term of this patent is extended or adjusted under 35 U.S.C. 154(b) by 222 days.

(21) Appl. No.: 11/809,239

(22) Filed: May 31, 2007

(51) Int. Cl.
*G01S 1/00* (2006.01)
*G01S 13/00* (2006.01)

(52) U.S. Cl. ....................... 342/385; 342/195

(58) Field of Classification Search ............ 342/195, 342/357.06, 357.12, 385, 386; 701/213, 701/215
See application file for complete search history.

(56) References Cited

U.S. PATENT DOCUMENTS

| | | | | |
|---|---|---|---|---|
| 6,448,926 | B1 * | 9/2002 | Weinberg et al. | 342/357.06 |
| 6,614,806 | B1 * | 9/2003 | Nanni | 370/468 |
| 2002/0003494 | A1 * | 1/2002 | Huisken | 342/357.12 |
| 2002/0186170 | A1 * | 12/2002 | Ceccom et al. | 343/705 |
| 2007/0275679 | A1 * | 11/2007 | Gibson et al. | 455/179.1 |
| 2008/0303714 | A1 * | 12/2008 | Ezal et al. | 342/357.12 |

* cited by examiner

*Primary Examiner*—Dao L Phan
(74) *Attorney, Agent, or Firm*—Daniel M. Barbieri

(57) ABSTRACT

The present invention is an apparatus and method for simultaneously processing multiple communication and navigation signals. An apparatus of the present invention may comprise a single receiver with a direct radio frequency (RF) sampling front end, a single analog to digital converter, a digital downconverter and a digital signal processor. In an embodiment of the invention, the receiver of the present invention may simultaneously process navigation signals in the 108-118 MHz band and communication signals in the 118-137 MHz band.

18 Claims, 9 Drawing Sheets

MULTIPLE SIGNAL RECEIVER

FIELD OF THE INVENTION

The present invention generally relates to airborne avionic systems. Particularly, embodiments of the present invention relate to an airborne system capable of simultaneously processing multiple communication and navigation signals.

BACKGROUND OF THE INVENTION

Very high frequency (VHF) is the radio frequency range from 30 MHz to 300 MHz. The VHF band is commonly used for terrestrial navigation systems, VOR (VHF Omni-directional Radio Range) in particular, marine communication, and aircraft communications.

Conventional aircraft radio receivers for VHF communication/navigation (com/nav) have a single channel architecture. One radio hardware "channel" (RF, IF, Baseband) is used per signal received. However, there is a demand for more channels per platform. For example, new datalink modes consume VHF receivers while existing communication and navigation requirements have remained constant. Also, in military applications, communication is becoming less point-to-point and more networked which increases the number of required channels.

Adding additional channels to receivers is expensive in terms of size, weight, power, and cost (SWAP-C). Therefore, it would be desirable to provide a radio that can process a large amount of signals with a single front end, for example, a single receiver simultaneously processing multiple communication and navigation signals.

SUMMARY OF THE INVENTION

The present invention is directed to an apparatus and method for simultaneously processing multiple communication and navigation signals. An apparatus of the present invention may comprise a single receiver with a direct radio frequency (RF) sampling front end, a single analog to digital converter, a FPGA-based digital down-converter and a digital signal processor. In an embodiment of the invention, the receiver of the present invention may simultaneously process navigation signals in the 108-118 MHz band and communication signals in the 118-137 MHz band.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
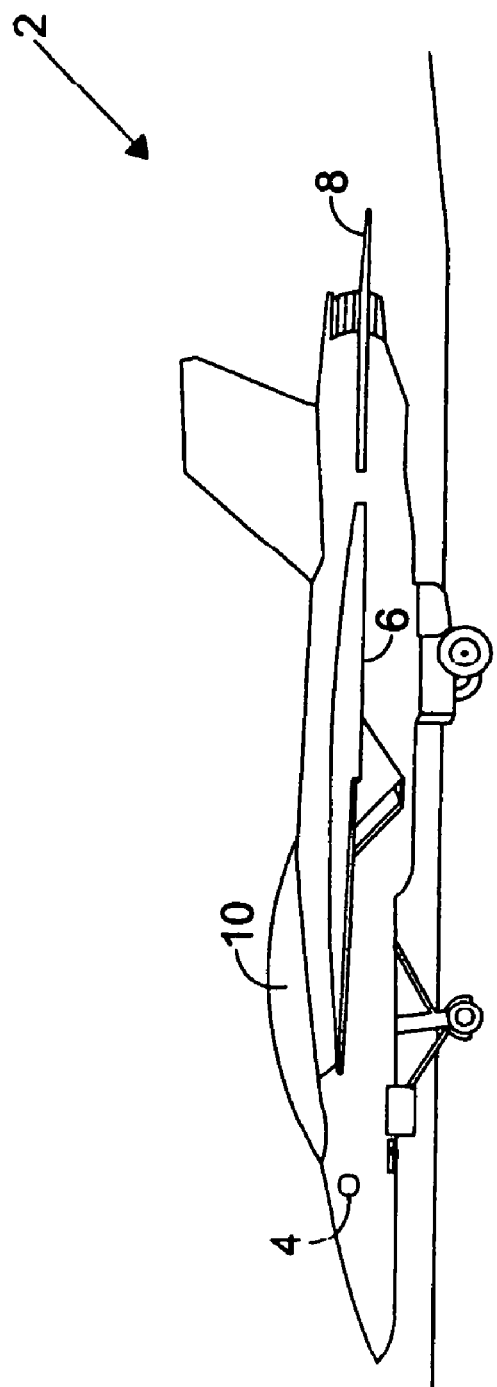
FIG. 1 is a side profile view of an aircraft in accordance with an embodiment of the present invention.

Reference will now be made in detail to embodiments of the invention, examples of which are illustrated in the accompanying drawings.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

The present invention is directed to an apparatus and method for simultaneously processing multiple communication and navigation signals. An apparatus of the present invention may comprise a single radio device with a direct radio frequency (RF) sampling front end, a single analog to digital converter, a FPGA-based digital downconverter and a digital signal processor. In an embodiment of the invention, the receiver of the present invention may simultaneously process navigation signals in the 108-118 MHz band and communication signals in the 118-137 MHz band. The receiver of the present invention may improve size, weight, and power considerations and a cost reduction may be realized.

For purposes of the disclosure, embodiments of the present invention can be implemented on most any type of vehicle, such as an aircraft shown in FIG. 1. A modern fighter aircraft 2 includes a fuselage 4 having a pair of wings 6, a tail 8, and a transparent pilot canopy 10. While the description of the present invention is referenced to fighter aircraft 2, it is fully contemplated that embodiments of the present invention may be extended to any aircraft, including cargo planes, airliners, and business aircraft without departing from the spirit of the invention.

Figure 2:
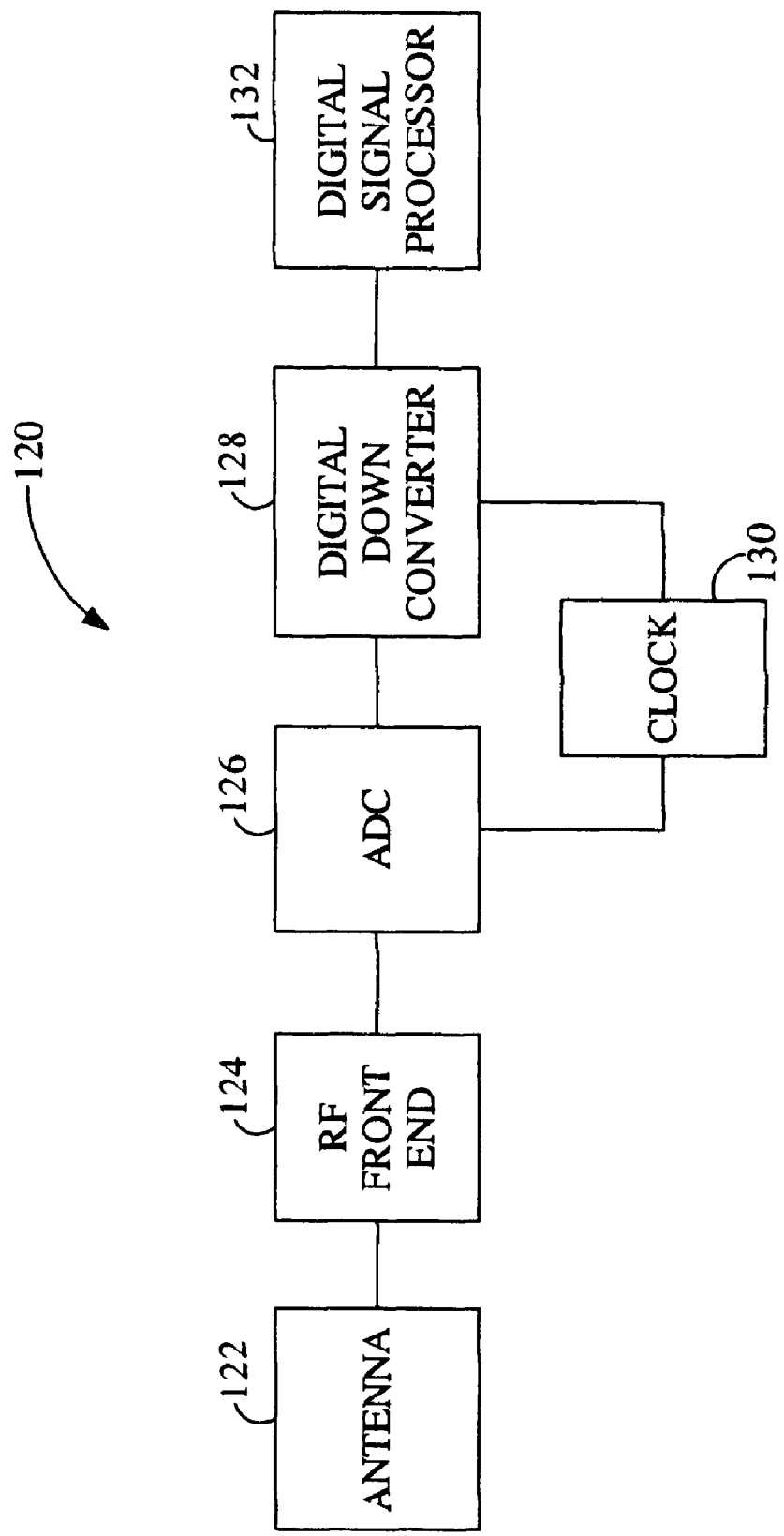
FIG. 2 shows a block diagram of a multiple signal receiver in accordance with an embodiment of the present invention.

Referring to FIG. 2, a block diagram of a multiple signal receiver 120 in accordance with an embodiment of the present invention is shown. Receiver 120 may be a direct sampling receiver capable of receiving multiple ATC (air traffic control) voice and/or VOR signals simultaneously. This direct sampling prevents splitting a signal which can significantly reduce loss in SNR (signal to noise ratio). Communication (Com) signals may be in the 118-137 MHz band and navigation (Nav) signals may be located in the 108-118 MHz band.

Receiver 120 may comprise an antenna 122, a RF front end 124, a single analog to digital converter (ADC) 126, a digital down-converter (DDC) 128, a clock 130, and a digital signal processor (DSP) 132 all of which are discussed in more detail below.

Antenna 122 can be most any type of VHF antenna, such as an AVT-4 VHF antenna, without departing from the spirit of the invention. In an embodiment of the invention, antenna 122 may have a reception range between 100-145 MHz, preferably with a reception range between 108-137 MHz. It is contemplated that antenna 122 may be a single antenna or may be multiple antennas. For example, a first antenna may have a reception range of 108-118 MHz and a second antenna may have a reception range of 118-137 MHz. Antenna 122 may receive RF signals and relay these communications to RF front end 124. Antenna 122 may also be utilized for transmitting communication. Further, it is fully contemplated that antenna 122 could be a horizontal polarized antenna for receiving navigational communications and/or a vertically polarized antenna for receiving voice communications.

Figure 3:
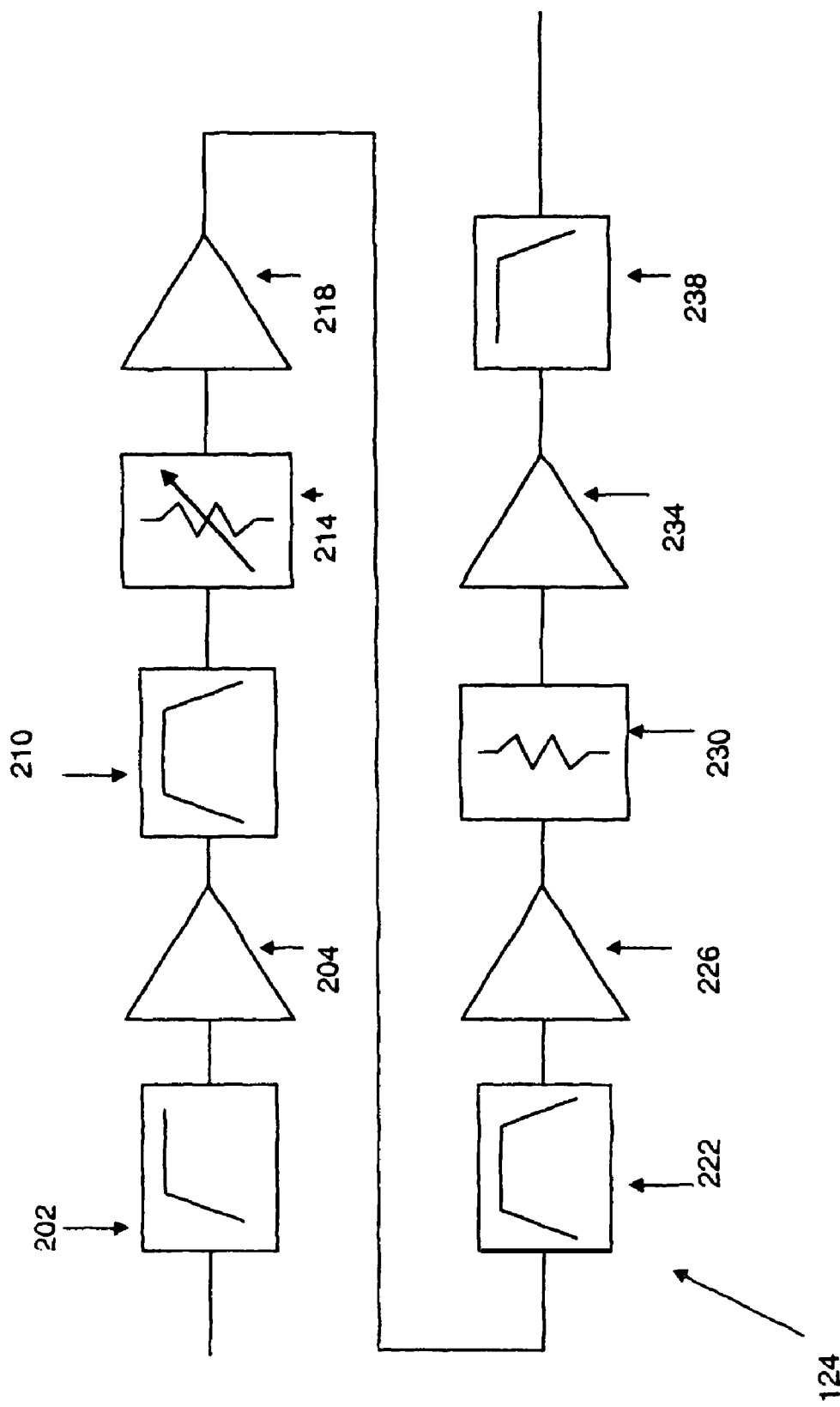
FIG. 3 shows a block diagram of a RF front end in accordance with an embodiment of the present invention.

Referring to FIG. 3, a block diagram of RF front end 124 in accordance with an embodiment of the present invention is shown. RF front end 124 may provide amplification and filtering of incoming RF signals in the VHF band from antenna 122. RF front end 124 may comprise a high pass filter 202 which may cut off frequencies below a desired frequency, such as 108 MHz. This may limit received frequencies to 108 MHz and above. Amplifier 204 may amplify the high pass filtered signal to assist in preventing signal loss. An amplified signal may be passed through band pass filter 210 to cut off most all frequencies above 137 MHz. Digital attenuator 214 receives the filtered signal from band pass filter 210 and may act to resolve the lowest signal level. Amplifier 218 may receive the output of digital attenuator 214 to prevent signal loss. A SAW (surface acoustic wave) filter 222, may act as a finite impulse response filter whose output is fed to amplifier 226 to prevent signal loss.

Attenuator 230 may resolve signals within the output of amplifier 226, the output of attenuator 230 being amplified by amplifier 234. An amplified signal may be passed through low pass filter 238 to filter out any harmonics. According to an embodiment of the invention, amplifiers 204, 218, 226, 234 may be high IIP3 (Input Third Order Intercept Point) amplifiers and filtering may be implemented to handle high power FM broadcast signals.

The output signal of the RF front end 124 may be passed to ADC 126 (FIG. 2). While the above embodiment shows one signal 240 being passed to ADC 126, it is fully contemplated that the output signal of RF front end 124 may be a sum of multiple signals without departing from the spirit of the invention.

RF front end 124 may be implemented in any type of com/nav receiver according to various embodiments of the invention. For example, RF front end 124 may be implemented within receivers such as a VHF-4000 and NAV-4000 currently offered for commercial use by Rockwell Collins, Inc., however, other front end receivers could be used without departing from the spirit of the invention.

In an advantageous aspect of the present invention, RF front end 124 may not require analog frequency conversion circuits as required by conventional receivers, such as a super-heterodyne receiver. RF front end may band limit the RF and may sample the signals directly whereby the entire band of interest is digitized. In an embodiment of the invention, a band between 108-137 MHz may be digitized. Receiver 120 may be a direct sampling receiver whereby the information bandwidth may be aliased through the sampling process.

Referring once again to FIG. 2, ADC 126 is discussed. ADC 126 may be a single analog to digital converter capable of simultaneously processing multiple signals received by RF front end 124. ADC 126 may be implemented as an electronic circuit that converts continuous signals, such as an output signal from RF front end 124, to discrete digital numbers. The digital output may utilize different coding schemes, such as binary and two's complement binary. However, some non-electronic or only partially electronic devices, such as rotary encoders, can also be considered ADCs without departing from the spirit of the invention. ADC 126 may sample at a rate of 48.4 MHz, which may be half a clocking speed of clock 130, discussed in more detail below. This rate of sampling may preferably be equal to or greater than double the signal information bandwidth (108 MHz to 137 MHz, or 29 MHz) and thus falls into a reliable sampling rate defined by the Nyquist frequency, although any sampling rate that offers acceptable performance may be used in the invention. In one embodiment of the invention, the sample rate has been chosen to simultaneously alias signals from multiple Nyquist sampling zones to enable a single analog to digital converter to simultaneously process large number of widely separated channels without excessive over sampling. In an embodiment of the invention, ADC 126 may be a LTC2208 16 bit, 135 Msps (Mega samples per second) converter commercially offered by Linear Technology of Milpitas, Ca; however, other types of analog to digital converters may be utilized without departing from the scope and intent of the present invention.

In an advantageous aspect of the present invention, ADC 126 may be a single analog to digital converter. Conventional receivers of the present invention require multiple analog to digital converters. A single analog to digital converter may reduce size, weight, power consumption and cost of receiver 120.

Clock 130 may provide a reference signal for receiver 120. In a preferred embodiment, clock 130 may be low phase noise, low power, and low cost (to reduce overall cost of receiver 120). Clock 130 may provide a 96.768 MHz clocking signal 136 to ADC 126 (that is then halved to provide the ADC sampling frequency discussed above), and also provides a 96.768 MHz clocking signal to a digital downconverter (DDC) 128, which is discussed in more detail below. In an embodiment of the invention, clock 130 may be a CCHD-950 96.768 MHz oscillator commercially offered by Crystek of Ft. Meyers Fla. However, other types of clocks may be utilized without departing from the scope and intent of the invention.

Figure 4:
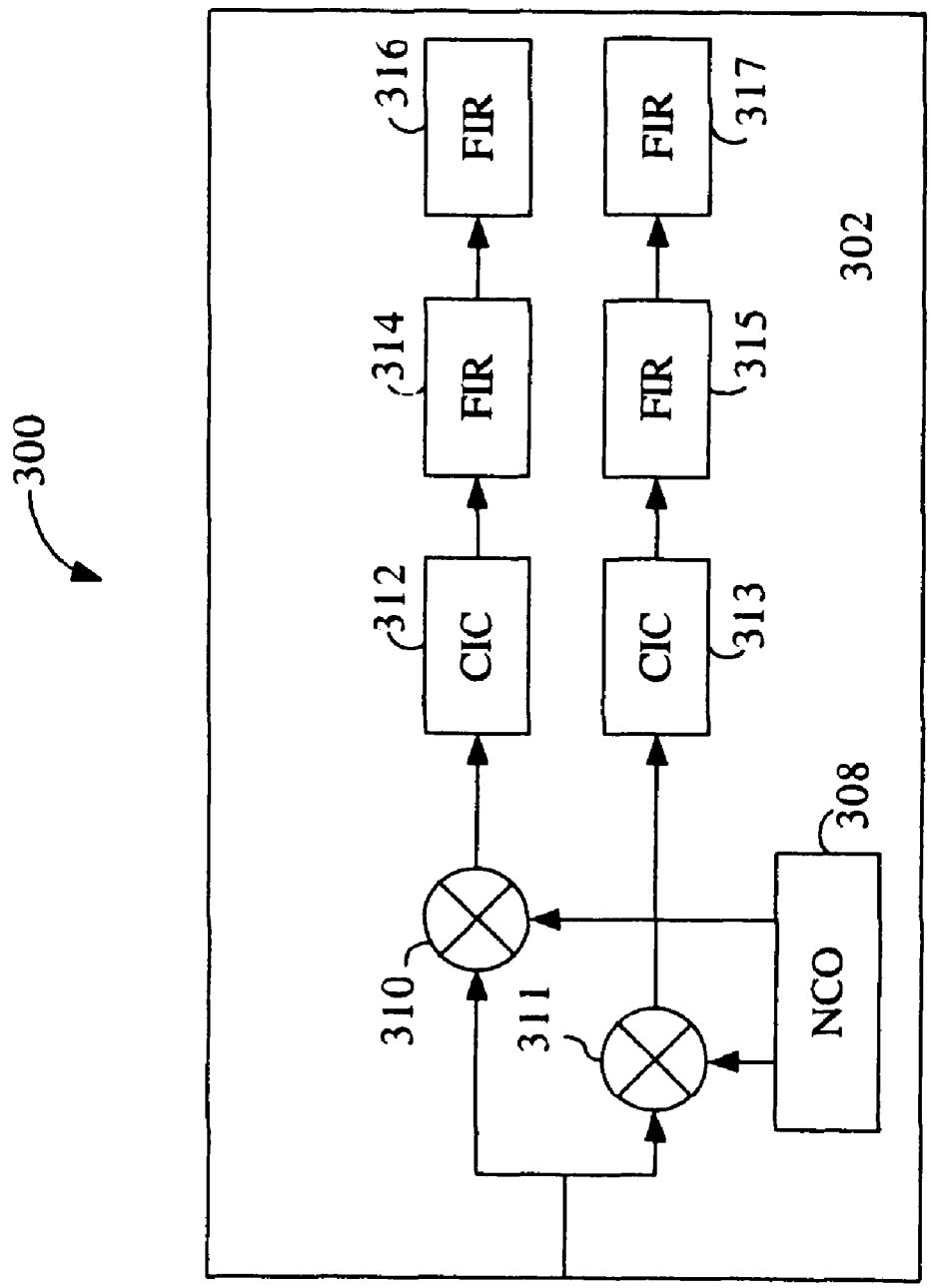
FIG. 4 shows a block diagram of a digital down converter in accordance with an embodiment of the present invention.

Referring to FIG. 4, a block diagram of a digital downconverter (DDC) 128 in accordance with an embodiment of the present invention is shown. DDC 128 may separate the desired channels. For example, DDC 128 may tune and filter each ATC voice or VOR channel from the output of ADC 126, such as a 16 bit, 96.768 Msps data signal. While only one channel is shown for DDC 128, DDC 128 may be implemented with three channels. It is further contemplated that DDC 128 may include any number of channels without departing from the scope and intent of the present invention. Each channel may be implemented with an output sample rate of 84 ksps (kilo samples per second) I/Q (in-phase/quadrature) samples to match a DSP clock interface, which is discussed in more detail below. The output of DDC 128 may have 32 bits of precision that may be paired down to 16 bits to match clock speed DSP interface, which is also discussed in more detail below.

In operation, DDC 128 may receive the output of ADC 126 and may mix it with a sine wave signal from a numerically controlled oscillator (NCO) 308 at mixers 310, 311. NCO 308 generates a sine wave signal representing a signal desired to be resolved. A sine wave signal may mix with the I and Q portions of ADC 128 output where a first mixer 310 receives the I portion and the second mixer 311 receives the Q portion. It is contemplated that NCO 308 may be tunable. Thus, the operator can adjust the NCO 308 to select a desired frequency. Further, it is contemplated that NCO may be tuned to less than 1 Hz and the tuning could be done to the center of the band. It is also contemplated that NCO 308 could automatically tune to a signal by searching through a range of signals.

A digital signal output of mixers 310, 311 may be decimated by CIC (cascaded-integrator comb) 64 bit filters (312, 313) which reduces the signal to 1.512 Msps. The output of CIC filters 312, 313 may be further reduced by FIR (first impulse response) filter 314, 315 by 9 bits which may produce an output of 168 ksps. The output of FIR filter 314, 315 may be further reduced by FIR filter 316, 317 by 2 which may reduce the signal, for example, to COM I/Q data at 84 ksps. COM I/Q data may be received by DSP 132 (FIG. 2).

In an embodiment of the invention, DDC 128 may be implemented as a field programmable gate array (FPGA). FPGA may be a Stratix II-180 offered commercially by Altera of San Jose, Calif., however, FPGA may be any type of FPGA, including an Altera Cyclone II or Xilinx Spartan III, without departing from the scope and intent of the invention. In addition, the DDC may be implemented by an ASIC, or by software running in a general purpose or special purpose processor, without departing from the scope and intent of the invention.

Figure 5:
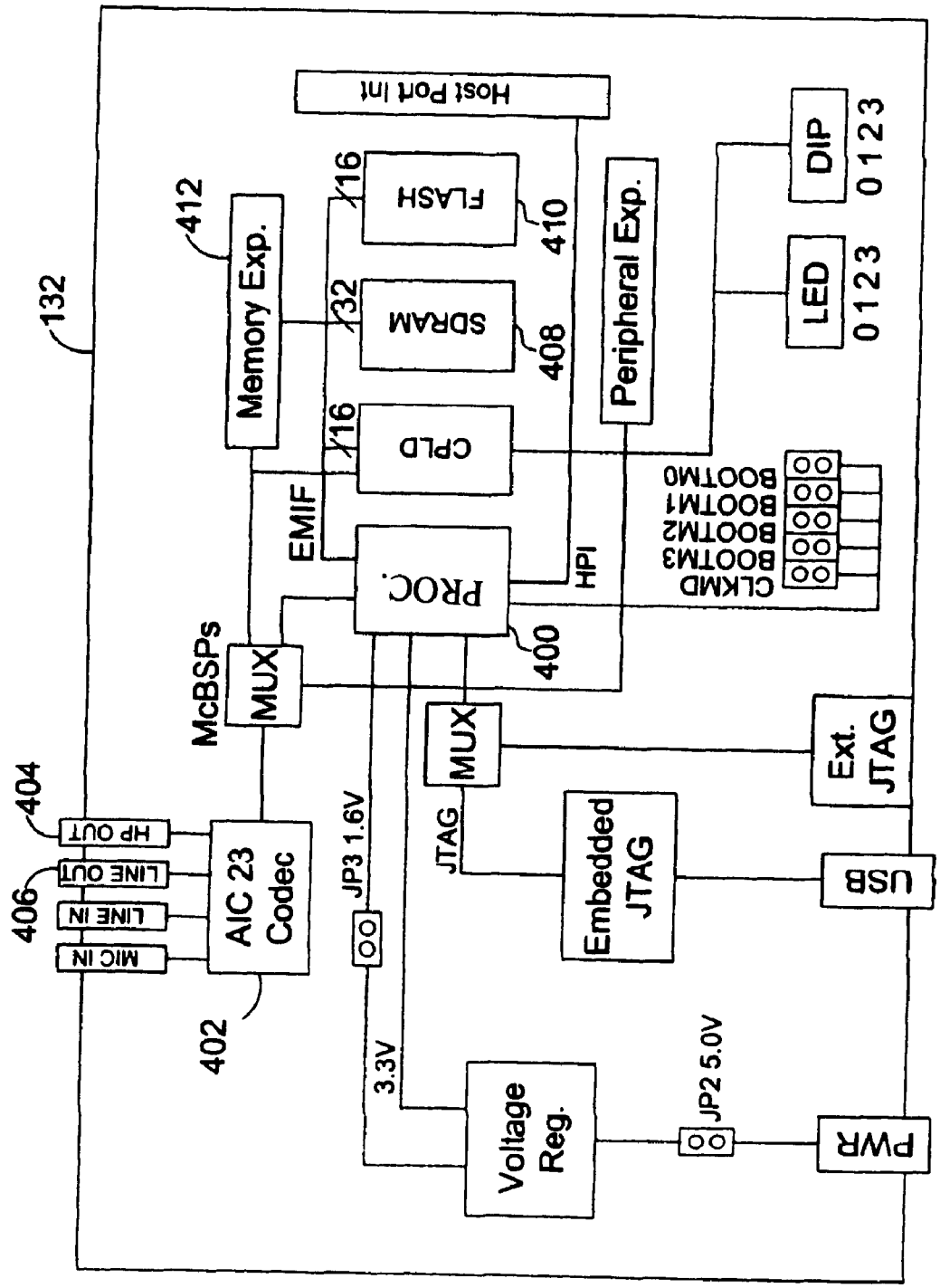
FIG. 5 shows a block diagram of a digital signal processor in accordance with an embodiment of the present invention.

Referring to FIG. 5, a block diagram of a digital signal processor (DSP) 132 in accordance with an embodiment of the present invention is shown. DSP 132 may be a multi-thread processor and may simultaneously demodulate multiple channels. For example, DSP 132 receives an output of DDC 128, such as COM I/Q data and demodulates the data into voice for VHF Com or radial for VOR. DSP 132 may demodulate the output of DDC 128, such as 84 ksps COM I/Q data, with an appropriate algorithm, discussed in more detail below. For example, demodulation may be implemented with a Spectrum Digital DSK (DSP starter kit) with a TI 5510 fixed-point processor, however, it is fully contemplated that most any DSP may be utilized without departing from the scope and intent of the invention. In an embodiment of the present invention, DSP 132 may demodulate two VHF ATC voice channels and one VOR channel, however, any number of channels may be demodulated without departing from the spirit of the invention.

As discussed above, DSP 132 may comprise a processor 400 which may perform the demodulation. Processor 400 relays to CODEC (compressor/decompressor) 402 audio samples at an 8 ksps rate. VHF Com channel 1 404 may be output as stereo left and VHF Com channel 2 406 can be output as stereo right. DSP 132 may include memory elements such as SDRAM (synchronous dynamic random access memory) 408, flash memory 410, and/or memory expansion 412 to retain the algorithms and programs discussed in more detail below. A DSP input baseband sample rate of 84 kHz may be selected to match current circuit switching equipment. This rate may be eight times the 10.5 ksym/sec for VHF Data Link (VDL). Any DSP processing rate may be implemented without departing from the scope and intent of the invention.

Figure 6:
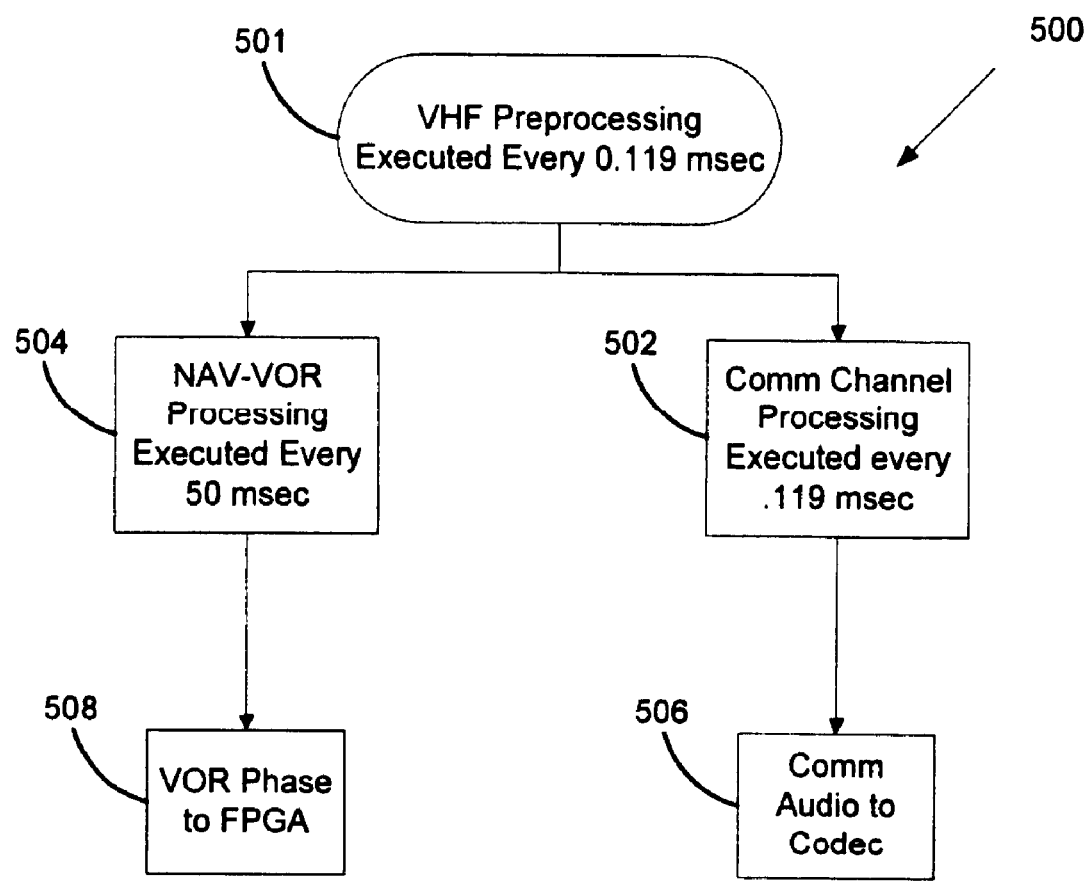
FIG. 6 shows a flow diagram of an overall VHF demodulation scheme in an embodiment of the present invention.

Referring to FIG. 6, a flow diagram of a VHF demodulation process 500 in accordance with an embodiment of the present invention is shown. VHF demodulation process 500 may include a VHF preprocessing, communication channel processing, Com audio demodulation and instrumentation, NAV-VOR Processing, and VOR phase to FPGA.

Figure 7:
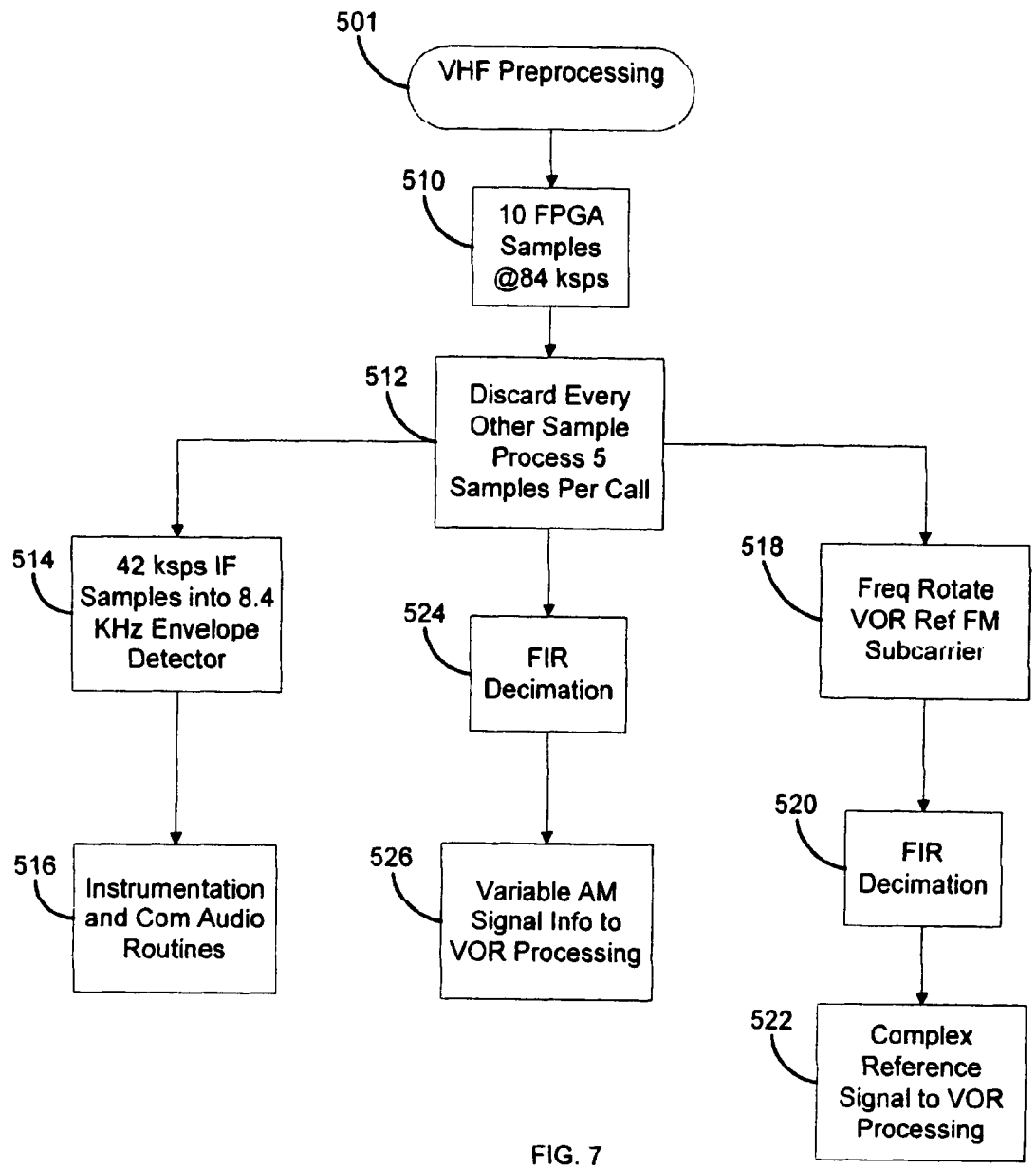
FIG. 7 shows a more detailed flow diagram of a VHF demodulation scheme in an embodiment of the present invention.

Referring to FIG. 7, a more detailed flow diagram of a VHF demodulation process 500 in an embodiment of the present invention is shown. Demodulation of VHF signal may begin with a preprocessing function 501 which can carry out initial filtering processes for the subsequent Corn and VOR processing routines by only being called to execute every 0.119 ms. An 84 KHz sample rate may be performed 510 to further decimate the signal. Further, every other sample may be discarded at state 512 which may be more than adequate for analog voice.

For subsequent Com audio processing, an envelope detector calculates the magnitude of the complex baseband signal 514 for the instrumentation and Com audio routines 516. For NAV-VOR processing, the 42 kHz signal is split into 30 Hz 518 creating variable AM signal information (electronically rotated by the VOR source. The signal may be further decimated by a FIR filter to 8.4 KHz 520. A complex reference signal may be sent for VOR processing at state 522. The 42 KHz signal may be is decimated by an FIR filter to 8.4 KHz 524 which may create variable AM signal information for VOR processing 526.

Figure 8:
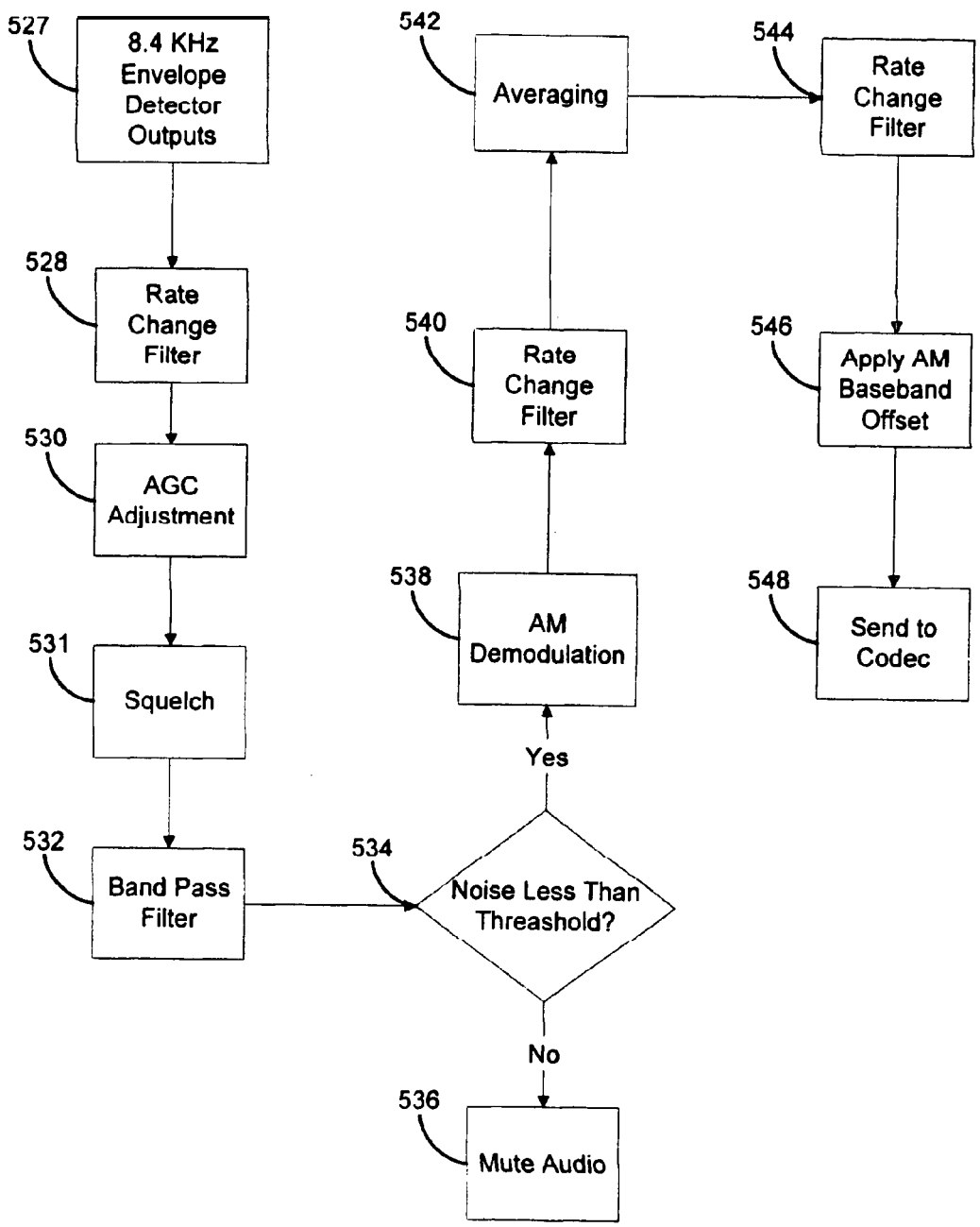
FIG. 8 shows a detailed flow diagram of a Com channel processing routine in an embodiment of the present invention.

Referring to FIG. 8, a detailed flow diagram of a Corn channel processing routine in an embodiment of the present invention is shown. An 8.4 KHz envelope detector output 527 is sent to a rate change filter 528. The rate change filter acts as a decimating filter that reduces the sample rate to 16.8 ksps. This may be followed by an AGC routine 530 for volume control and a squelch routine 531 for noise control. The signal may be passed through a band pass filter that limits the signal to between 4.5 KHz and 6 KHz 532. If the SNR is not below a predetermined threshold 534, the audio is muted 536. If the SNR is below a predetermined threshold 534, the AM signal is demodulated 538. The signal is rate change filtered to between 16.8 KHz and 6.72 KHz 540. The signal may be averaged 542 and then rate change filtered again to between 6.72 KHz and 3.2 KHz 544. An AM baseband offset is then applied 546, and the signal may be sent to codec 548 for output.

Figure 9:
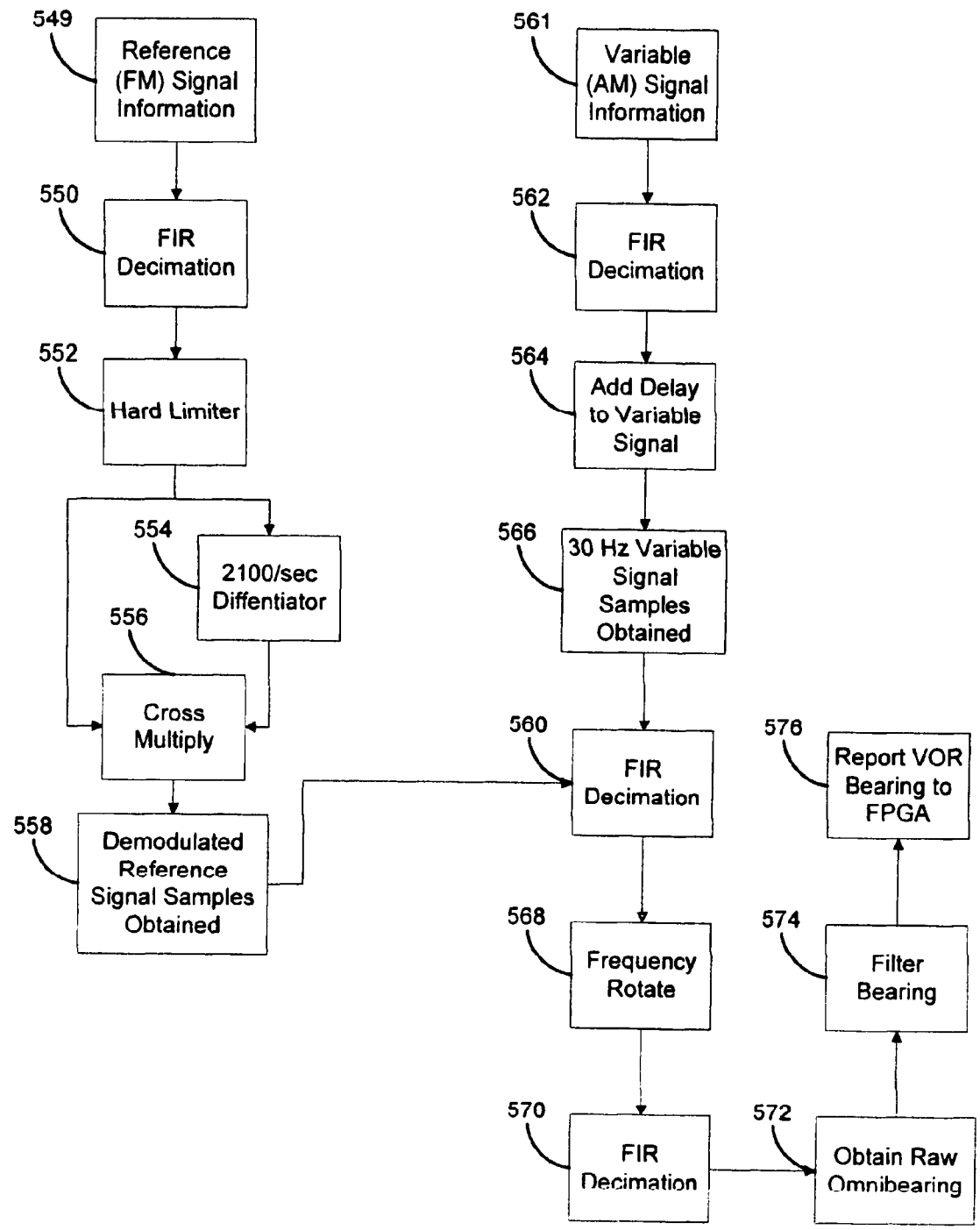
FIG. 9 shows a detailed flow diagram of a NAV/VOR signal processing routine in an embodiment of the present invention.

Referring to FIG. 9, a detailed flow chart diagram of a NAV/VOR signal processing routine in an embodiment of the present invention is shown. A 30 Hz FM reference signal may be decimated to a 60 Hz center from 9.96 kHz center in the preprocessing routine 549. Signal may be decimated by a FIR filter from 8.4 KHz to 2.1 KHz 550. The signal may pass a hard limiter 552, which may normalize the reference FM signal's I and Q components. FM demodulation of the reference signal may be executed through cross multiplication 556 of normalized signal values and outputs of a differentiator filter 554. The demodulated reference signal samples may be obtained 558 and sent to a FIR decimation 560, which is discussed in more detail below.

Variable AM signal information 561 may be sent to an FIR filter for decimation 562 for reduction from 8.4 KHz to 2.1 KHz. A delay may be added to the variable signal 564. The delay may be half the differentiator length. The 30 Hz variable signal samples may be obtained 566. The 30 Hz reference and variable signals are then both decimated to 100 Hz 560. Signals may be frequency rotated to 30 Hz to DC producing I and Q components for each of the reference and variable signals at state 568. The signal may be decimated with an FIR filter 570 from 100 Hz to 20 Hz. The raw omnibearing VOR result may be computed through phase comparison of the two signals 572. A raw result may be filtered and conditioned to vary from 0 to 360 degrees 574. This final NAV-VOR bearing is sent to the FPGA board and ultimately to the system's display at state 576.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. Features of any of the variously described embodiments may be used in other embodiments. The form herein before described being merely an explanatory embodiment thereof. It is the intention of the following claims to encompass and include such changes.

What is claimed is:

1. A communications and navigational receiver, comprising:
    an antenna;
    a direct sampling radio frequency front end coupled to said antenna, the direct sampling radio frequency front end including a high pass filter with a cutoff frequency of 108 MHz and a low pass filter with a cutoff frequency of 137 MHz providing a digitized band between 108 MHz and 137 MHz;
    a single analog to digital converter coupled to an output of said radio frequency front end;
    a digital downconverter coupled to an output of said single analog to digital converter; and
    a digital signal processor coupled to the digital downconverter, wherein said antenna, said direct sampling radio frequency front end, said single analog to digital converter, said digital downconverter and said direct signal processor are configured for simultaneously processing at least three signals, said at least three signals being at least one of communication signals or navigation signals.

2. The receiver of claim 1, wherein said direct sampling radio frequency front end, said single analog to digital converter, said digital downconverter and said direct signal processor are configured for simultaneously processing a communication signal and a navigation signal.

3. The receiver of claim 2, wherein said navigation signal is a signal with a frequency of 108-118 MHz.

4. The receiver of claim 2, wherein said communication signal is a signal with a frequency of 118-137 MHz.

5. The receiver of claim 1, wherein said antenna is operable to receive wireless signals from 108-137 MHz.

6. The receiver of claim 1, wherein said digital downconverter includes three channels.

7. The receiver as claimed in claim 1, wherein said digital downconverter includes a numerically controlled oscillator.

8. A communications and navigational receiver, comprising:
    an antenna, said antenna being configured for receiving signals with a frequency range of 108-137 MHz;
    a direct sampling radio frequency front end coupled to said antenna, said direct sampling radio frequency front end digitizing an entire band of said frequency range of 108-137 MHz and directly sampling received signals, the direct sampling radio frequency front end including a high pass filter with a cutoff frequency of 108 MHz and a low pass filter with a cutoff frequency of 137 MHz;
    a single analog to digital converter coupled to an output of said radio frequency front end;
    a digital downconverter coupled to an output of said single analog to digital converter; and
    a digital signal processor coupled to the digital downconverter, wherein said antenna, said direct sampling radio frequency front end, said single analog to digital converter, said digital downconverter and said direct signal processor are configured for simultaneously processing at least three signals, said at least three signals being at least one of communication signals or navigation signals.

9. The receiver of claim 8, wherein said direct sampling radio frequency front end, said single analog to digital converter, said digital downconverter and said direct signal processor are configured for simultaneously processing a communication signal and a navigation signal.

10. The receiver of claim 9, wherein said navigation signal is a signal with a frequency of 108-118 MHz.

11. The receiver of claim 9, wherein said communication signal is a signal with a frequency of 118-137 MHz.

12. The receiver of claim 8, wherein said digital signal processor is a multi-thread processor.

13. A communications and navigational receiver, comprising:
    means for receiving signals, the receiving means being configured for receiving wireless signals from about 108-137 MHz;
    a direct sampling radio frequency front end coupled to said receiving means, said direct sampling radio frequency front end direct sampling signals received by said receiving means, the direct sampling radio frequency front end including a high pass filter with a cutoff frequency of 108 MHz and a low pass filter with a cutoff frequency of 137 MHz providing a digitized band between 108 MHz and 137 MHz;
    a single analog to digital converter coupled to an output of said radio frequency front end;
    a digital downconverter coupled to an output of said single analog to digital converter; and
    means for processing signals, said processing means receiving an output of said digital downconverter; wherein said receiving means, said direct sampling radio frequency front end, said single analog to digital converter, said digital downconverter and said processing means are configured for simultaneously processing at least three signals, said at least three signals being at least one of communication signals or navigation signals.

14. The receiver of claim 13, wherein said direct sampling radio frequency front end, said single analog to digital converter, said digital downconverter and said processing means are configured for simultaneously processing a communication signal and a navigation signal.

15. The receiver of claim 14, wherein said navigation signal is a signal with a frequency of 108-118 MHz.

16. The receiver of claim 14, wherein said communication signal is a signal with a frequency of 118-137 MHz.

17. The receiver of claim 14, wherein said digital downconverter separates desired channels for receipt of at least one of a communication signal or navigation signal.

18. The receiver as claimed in claim 17, wherein said digital downconverter includes a numerically controlled oscillator, said numerically controlled oscillator being tunable to less than 1 Hz.

* * * * *